(12) United States Patent
Fidi et al.

(10) Patent No.: US 11,366,726 B2
(45) Date of Patent: Jun. 21, 2022

(54) COMMUNICATION NODE FOR CRITICAL SYSTEMS

(71) Applicant: TTTech Computertechnik AG, Vienna (AT)

(72) Inventors: Christian Fidi, Dietmanns (AT); Günther Bauer, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 290 days.

(21) Appl. No.: 16/556,537

(22) Filed: Aug. 30, 2019

(65) Prior Publication Data

US 2020/0073766 A1 Mar. 5, 2020

(30) Foreign Application Priority Data

Sep. 3, 2018 (EP) .................................... 18192221

(51) Int. Cl.
*G06F 11/00* (2006.01)
*G06F 11/16* (2006.01)
(Continued)

(52) U.S. Cl.
CPC ...... *G06F 11/1679* (2013.01); *G06F 11/1604* (2013.01); *H04L 65/1083* (2013.01); *H04L 65/80* (2013.01)

(58) Field of Classification Search
CPC ............. G06F 11/1679; G06F 11/1604; G06F 11/0709; G06F 11/1608; G06F 11/1629;
(Continued)

(56) References Cited

U.S. PATENT DOCUMENTS 5,349,654 A 9/1994 Bond et al.
5,550,736 A 8/1996 Hay et al.
(Continued)

OTHER PUBLICATIONS

European Search Report, for EP Application No. 18192221.2, dated Mar. 14, 2019 (13 pages).

*Primary Examiner* — Joseph D Manoskey
(74) *Attorney, Agent, or Firm* — Eversheds Sutherland (US) LLP

(57) ABSTRACT

A communication node (NODE) for connecting a fault-tolerant computer (FTC) to a real-time network (NET), wherein the node receives critical application data (HCAD1, HCAD2) from computation hosts (HOST) of the fault-tolerant computer, and the node is configured to forward the critical application data as node critical application data (NCAD) to the NET. The node includes at least a first end system (ES1), a second end system (ES2) and a switch (SW), and the switch includes at least a commander part (COM), a monitor part (MON) and a comperator part (COMP). The MON and the COMP may be integrated into an integrated part (MONC). The ES1 connects to the computation hosts or a subset thereof, and the ES2 connects to the computation hosts or a subset thereof. The ES1 connects to the COM, and the ES2 connects to the MON. The computation hosts or a subset thereof provide first host critical application data (HCAD1) to the ES1, and the computation hosts or a subset thereof provide second host critical application data (HCAD2) to the ES2. The ES1 is configured to forward the HCAD1 as first end system critical application data (ESCAD1) to the COM and the ES2 is configured to forward the HCAD2 as second end system critical application data (ESCAD2) to the MON. The COM is configured to forward the ESCAD1 as commander critical application data (CCAD) to the COMP at a pre-configured commander forwarding point in time (TCOM), and the
(Continued)

MON is configured to forward the ESCAD2 as monitor critical application data (MCAD) to the COMP at a pre-configured monitor forwarding point in time (TMON). If the MON and the COMP are not integrated into an integrated part, then the COMP is configured to forward either the CCAD or the MCAD as node critical application data (NCAD), if and only if, the CCAD and the MCAD are identical and the COMP starts to receive the CCAD and the MCAD within an interval of configured length (SYNC-1). Alternatively, if the MON and the COMP are integrated into an integrated part (MONC), then the COM is configured to forward the ESCAD1 as NCAD to the NET. The switch includes an interception function (INTERCEPT) which is configured to (i) preempt an ongoing transmission of NCAD and/or (ii) prevent the transmission of NCAD, and the COMP is configured to activate the interception function if and only if the CCAD and the MCAD are not identical or the COMP does not start to receive the CCAD and the MCAD within SYNC-1.

20 Claims, 9 Drawing Sheets

(51) Int. Cl.
*H04L 65/80* (2022.01)
*H04L 65/1083* (2022.01)

(58) Field of Classification Search
CPC ............. G06F 11/1641; G06F 11/1675; G06F 11/0739; G06F 11/3013; H04L 65/1083; H04L 65/80
See application file for complete search history.

(56) References Cited

U.S. PATENT DOCUMENTS

| | | |
|---|---|---|
| 2009/0323704 A1 | 12/2009 | Hall et al. |
| 2011/0276199 A1* | 11/2011 | Brot ................... G05D 1/0077 701/3 |
| 2017/0132065 A1 | 5/2017 | Schwarz et al. |
| 2017/0262330 A1* | 9/2017 | Kopetz ............... G06F 11/1641 |
| 2018/0290730 A1* | 10/2018 | Brot ..................... G05B 19/02 |

* cited by examiner

COMMUNICATION NODE FOR CRITICAL SYSTEMS

CROSS REFERENCE TO RELATED APPLICATIONS

This application claims priority to European Patent Application No. 18192221.2, filed Sep. 3, 2018, which is incorporated herein by reference.

SUMMARY OF THE INVENTION

The invention relates to a communication node for connecting a fault-tolerant computer to a real-time network, wherein said communication node receives critical application data from one, two, or a multitude of computation hosts of the fault-tolerant computer, and wherein said communication node is configured to forward said critical application data as node critical application data to said real-time network.

Furthermore the invention relates to a fault-tolerant distributed computer system comprising a multitude of fault-tolerant computers.

The invention relates to the high-integrity design of a communication node for a real-time network to be used for safety-critical applications. Furthermore, the invention relates to the usage of said communication node in a fault-tolerant distributed computer system. Said communication node operates as a communication interface between one or many computation hosts and said real-time network. The computation hosts are connected to the communication node by means of host connections.

In order to realize the safety-critical applications, the computation hosts exchange application data with each other. Some or all of the application data may be so-called "critical" application data. The communication node is able to distinguish critical application data from non-critical application data, e.g., by information transported within the application data or by a further signaling mechanism between the computation host and the communication node.

The present invention describes a communication node which implements specific protection mechanisms for critical data.

The communication node receives application data from the real-time network (typically by means of the one, two, or multitude of network connections) and provides said application data (or parts of said application data) to the one, two, or multitude of computation hosts. The communication node also receives application data from the one, two, or multitude of communication hosts via the host connections and sends said application data via said one, two, or multitude of network connections to the real-time network. Some or all of the application data may be critical application data.

At any point in time the communication node is either correct or faulty. A communication node is considered to be correct if it operates according to its specification. Analogously, a communication node is considered to be faulty, if the communication node does not execute according its specification. If the communication node is faulty it may exhibit a failure at the one, two, or multitude of network connections. In particular, the failure could manifest in the communication node to send arbitrary application data on network connections, in particular, the faulty communication node could by itself generate arbitrary application data and, thus, send application data to the real-time network that it did not receive prior from a host.

It is an objective of this invention to disclose how to construct a communication node in a way that the failure modes of the communication node will be restricted with very high probability.

In particular, it is an objective of the invention to increase the probability that a faulty communication node only sends such critical application data to the one, two, or multitude network connections that it actually received from one, two, or a multitude of hosts within well-defined time bounds before the transmission to the real-time network.

Furthermore, it is also an objective of the invention to present a novel design of the communication node which ensures with high probability that a faulty computation host will not be able to send arbitrary application data to the real-time network, in particular if the communication node is correct.

This objective is achieved with a node according to the invention, wherein the communication node comprises at least a first end system, a second end system and a switch, and wherein said switch comprises at least a commander part, a monitor part and a comperator part, wherein for example the monitor part and the comperator part may be integrated into an integrated part, and wherein said first end system connects to said one, two, or a multitude of computation hosts or a subset of those computation hosts, and wherein said second end system connects to said one, two, or a multitude of computation hosts or a subset of those computation hosts, and wherein said first end system connects to said commander part and said second end system connects to said monitor part, and wherein said one, two, or multitude of computation hosts or a subset of those computation hosts provide first host critical application data to said first end system and said one, two, or multitude of computation hosts or a subset of those computation hosts provide second host critical application data to said second end system, and wherein said first end system is configured to forward said first host critical application data as first end system critical application data to said commander part and said second end system is configured to forward said second host critical application data as second end system critical application data to said monitor part, and wherein said commander part is configured to forward said first end system critical application data as commander critical application data to said comperator part at a pre-configured commander forwarding point in time, and wherein said monitor part is configured to forward said second end system critical application data as monitor critical application data to said comperator part at a pre-configured monitor forwarding point in time, and wherein either in the case that the monitor part and the comperator part are not integrated into an integrated part, said comperator part is configured to forward either the commander critical application data or the monitor critical application data as node critical application data, if and only if, said commander critical application data and said monitor critical application data are identical and the comperator part starts to receive said commander critical application data and said monitor critical application data within an interval of configured length, or in the case that the monitor part and the comperator part are integrated into an integrated part, the commander part is configured to also forward said first end system critical application data as node critical application data to the real-time network, and wherein the switch comprises an interception function which is configured to preempt an ongoing transmission of a node critical application data and/or is configured to prevent the transmission of a node critical application data, and said comperator part is configured to activate said interception function if and only if said commander critical application data and said monitor critical application data are not identical or the comperator part does not start to receive said commander critical application data and said monitor critical application data within an interval of configured length.

The probability of the failure mode of the communication node to transmit arbitrary application data to the real-time network will be reduced significantly. Furthermore, in the case that a first and a second computation host connect to said communication node the invention also ensures that critical application data is only forwarded from said hosts to the real-time network as node critical application data, if and only if both computation hosts forward the same critical application data to said communication node. Thus, in the failure case in which the communication node correct and one of said computation hosts is faulty, the computation node prevents the transmission of arbitrary application data from said faulty host to the real-time network.

In contrast to the state of the art in high-integrity design, the disclosed design of a node does not require specific synchronization logic between said two end systems and the switch. Instead, in one embodiment protocol data received from the real-time network is used to synchronize the two end systems and the switch to each other. In another embodiment critical application data received from the real-time network is used to synchronize the two end systems and the switch to each other. In another embodiment, the two end systems and the switch are not synchronized to each other at all.

In one of many embodiments of the invention, one, two, or a multitude of computation hosts and a communication node are packaged into a common housing and the communication node provides one, two, or a multitude of network connections to the real-time network.

The communication node disclosed consists of at least two end systems and a switch, where said switch consists of at least a commander part, a monitor part, and a comperator part. In one embodiment the monitor part and the comperator part are integrated in an integrated part. Said end systems are connected to the switch such that a first end system of said end systems is connected to the commander part of said switch and a second end system of said end systems is connected to the monitor part of said switch. Said first end system and said second end system receive application data and in particular critical application data from one, two, or a multitude of computation hosts. In the case that the end systems are correct, said first end system forwards said application data to the commander part of said switch and said second end system forwards said application data to the monitor part of said switch. When said end systems receive the same critical application data from the computation hosts, both end systems are correct and the switch is correct, then the switch will forward the critical application data to the network connection.

However, said first end system, said second end system, said commander part, or said monitor part may become faulty and in the case of failure may generate arbitrary application data (it is justifiable to assume that only one of said four items may fail at any given time and the probability that two or more of the listed four items fail at the same time is sufficiently low). The invention discloses how to configure the listed four items such that the internal failure mode of generating arbitrary application data is transformed to a benign external failure mode (i.e., that the probability that arbitrary application data is transmitted on the network connection and/or the host connection is sufficiently low).

For this, the switch implements synchronization measure to synchronize said commander part and monitor part to each other (e.g., by means of dedicated synchronization signals implemented between the commander part and the monitor part). The comperator part (and in some realizations together with an intercept function) is a means to restrict the failure mode of a faulty communication node. For example, the comperator part identifies cases when the communication node attempts to send arbitrary application data to the real-time network that it did not receive from any one of the computation hosts a well-defined duration before the transmission attempt. In one realization the comperator part prevents such faulty transmissions, in other realizations the comperator part together with said intercept function prevent such faulty transmissions.

Furthermore, in a fault-tolerant distributed computer system according to the invention, one or a multitude of said computers, in particular all of said computers, each comprises a node according to the invention, wherein a computer comprising such a node is connected to the real-time network with this node.

Advantageous embodiments of the node and of the fault tolerant computer system described above are detailed hereinafter:

The first end system may comprise a first end system local clock, the second end system may comprise a second end system local clock, the commander part may comprise a commander local clock, and the monitor part may comprise a monitor local clock, wherein said local clocks are synchronized to each other such that in a correct case said local clocks at any time do not differ more than a time duration of a known network synchronization difference, and wherein in the case that the first end system, or the second end system, or the commander part, or the monitor part is faulty, at least all local clocks of correct end systems, correct commander part, and correct monitor part are synchronized to each other such that said local clocks at any time do not differ more than a time duration of a known network synchronization difference.

A network protocol may be used to synchronize the end system local clocks, and/or the commander local clock, and/or the monitor local clock to each other.

The SAE AS6802 standard and/or the IEEE 802.1AS standard and/or the IEEE 1588 standard may be used to synchronize the end system local clocks, and/or the commander local clock, and/or the monitor local clock to each other.

The network protocol may be configured to synchronize the local clocks to one, two, or a multitude of local clocks in one, two, or a multitude of other communication nodes in other fault-tolerant computers, wherein the node and the one, two, or multitude of other fault-tolerant computers are connected to each other by means of a real-time network.

The commander local clock and the monitor local clock may be realized by the same physical clock such that said local clocks are synchronized to each other with a configurable value within an interval of configured length and the commander local clock and the monitor local clock experience zero relative drift from each other.

The commander part and the monitor part each may implement a local clock, which local clocks are synchronized to each other with a maximum synchronization difference.

For example, the maximum synchronization difference is smaller than the known network synchronization difference.

The commander part may have access to a commander schedule table that configures for each commander critical application data of the commander part a point in time when to forward said commander critical application data, and/or wherein the monitor part has access to a monitor schedule table that configures for each monitor critical application data of the monitor part a point in time when to forward said monitor critical application data.

The first end system and the second end system may have access to schedule tables that configure for said first end system and for said second end system a point in time when to forward said first end system critical application data and said second end system critical application data to the commander part or to the monitor part, respectively.

The node, in addition to critical application data, may also receive application data from one, two, or a multitude of computation hosts, which application data are not critical application data, and wherein the communication node forwards said application data as node application data to the real-time network without execution of the comparison part with respect to said not critical application data in the switch.

The node may connect the first end system and the second end system to both the commander part and the monitor part, wherein the commander part is configured to discard end system critical application data from the second end system, and wherein the monitor part is configured to discard end system critical application data from the first end system.

The node may be integrated in or is a component of the fault-tolerant computer which it connects to a real-time network.

In the Fault-tolerant distributed computer system the fault-tolerant computers may be connected to each other by two or a multitude of disjoint network paths of the real-time network. A transmitting fault-tolerant computer may transmit two or a multitude of copies of the same critical application data via said two or a multitude of disjoint network paths and a receiving fault-tolerant computer forwards only one copy of said critical application data to its computing host, preferably the first received copy of said critical application data.

The fault-tolerant computers may be connected to each other by three or a multitude of disjoint network paths of the real-time network. A transmitting fault-tolerant computer may transmit three or a multitude of copies of the same critical application data via said three or a multitude of disjoint network paths and a receiving fault-tolerant computer system executes majority voting, preferably a two-out-of-three majority voting, on said copies of said critical application data.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF THE INVENTION

We discuss some of the many implementations of the invention next. If not stated otherwise, all details described in connection with a specific example are not only valid in connection with this example, but apply to the general scope of protection of the invention.

Figure 1:
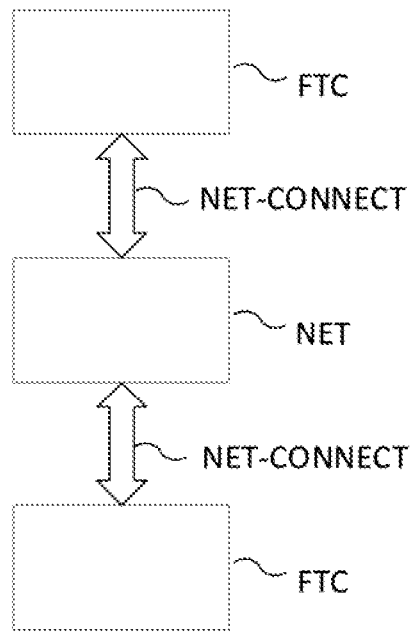
FIG. 1 depicts an example configuration of a fault-tolerant computer system with a real-time network connecting two fault-tolerant computers to each other.

FIG. 1 depicts an example of a fault-tolerant computer system comprising a real-time network NET that connects two fault-tolerant computers FTC via network connections NET-CONNECT to each other. Each of the fault-tolerant computers is configured to implement a communication node.

Figure 2:
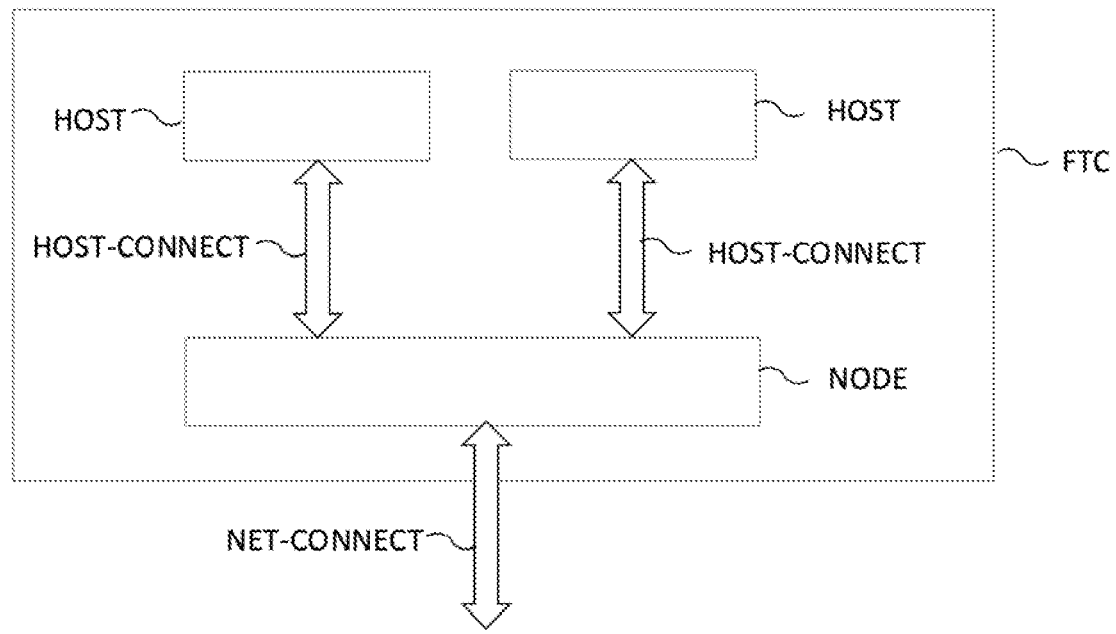
FIG. 2 depicts an example of an inner structure of a fault-tolerant computer.

FIG. 2 depicts an example of an inner structure of a fault-tolerant computer FTC. In particular, in this example two computation hosts HOST are depicted. Furthermore the fault-tolerant computer FTC is configured to implement a communication node NODE that connects to the computation hosts HOST by means of host connections HOST-CONNECT. Furthermore, the communication node NODE also connects to the real-time network NET by means of one, two, or a multitude of network connections NET-CONNECT. The communication node NODE is configured to receive host critical application data HCAD1, HCAD2 (see FIG. 5 and following figures) and to forward said data as node critical application data NCAD to the real-time network NET via said network connection(s) NET-CONNECT.

Figure 3:
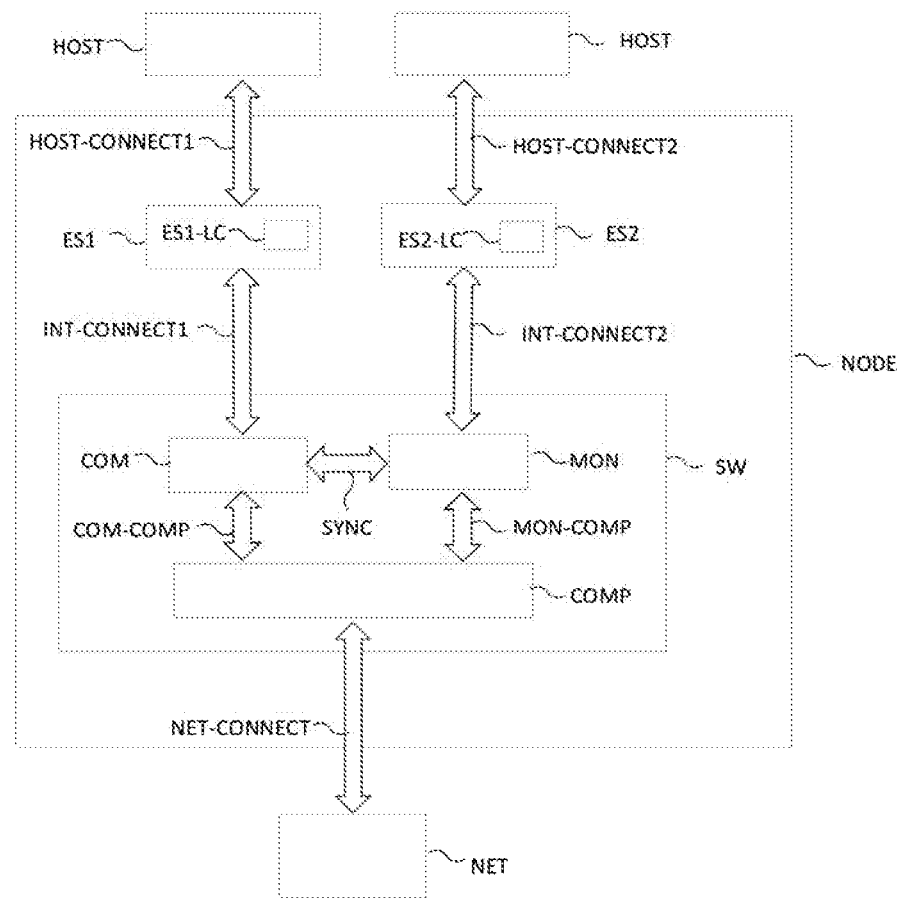
FIG. 3 depicts an example of an inner structure of a communication node.

FIG. 3 depicts an example of an inner structure of a communication node NODE. As depicted, in this example, the communication node NODE comprises two end system ES1, ES2, and a switch SW. The switch SW itself consists of three parts: a commander part COM, a monitor part MON, and a comperator part COMP. In another embodiment of this invention the comperator part may be integrated with the monitor part (not depicted in the figures).

The end systems ES1, ES2 are connected to one, two, or a multitude of computation hosts HOST by means of host connections HOST-CONNECT1, HOST-CONNECT2. Furthermore, both end systems are connected to the switch SW by means of internal connections INT-CONNECT1, INT-CONNECT2: a first end system ES1 connects to the commander part COM, while a second end system ES2 connects to the monitor part MON.

Figure 4:
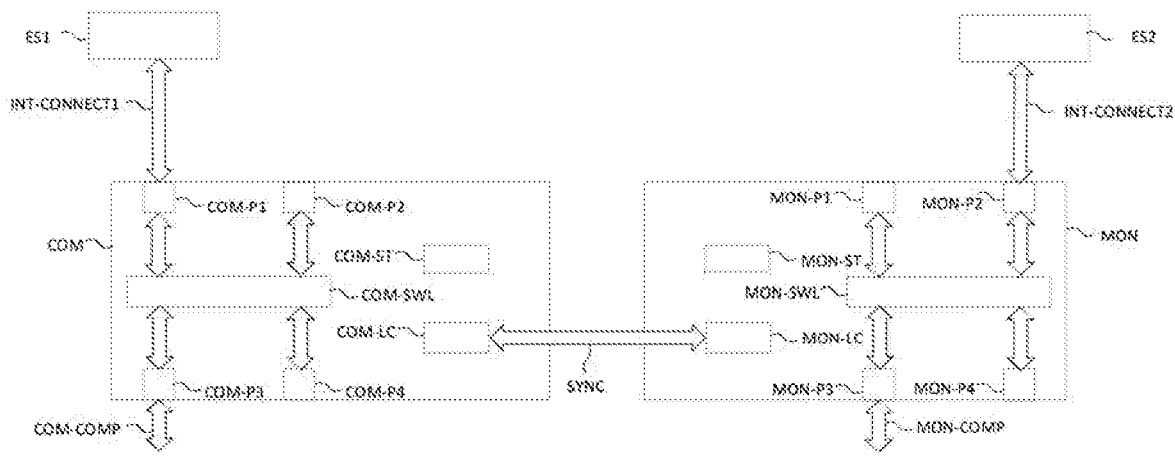
FIG. 4 depicts an example of the inner structure for the commander part and the monitor part and their synchronization.

The commander part COM has access to a local clock COM-LC and the monitor part MON has access to a local clock MON-LC, as will be shown in FIG. 4, and the switch SW is configured to synchronize said local clocks COM-LC, MON-LC to each other, for example by means of a synchronization logic SYNC.

The commander part COM is connected to a comperator part COMP by means of a commander connection COM-COMP. The monitor part MON is connected to a comperator part COMP by means of a monitor connection MON-COMP.

In this example the comperator part COMP is a separate part of the monitor part MON. In this example the comperator part COMP connects to the real-time network NET by means of a network connection NET-CONNECT.

Said first end system ES1 may have access to a first end system local clock ES1-LC and said second end system ES2 may have access to a second local clock ES2-LC. Said first end system clock ES1-LC and said second end system clock ES2-LC and said commander local clock COM-LC and said monitor local clock MON-LC may be synchronized to each other with a maximum synchronization difference of their local clocks of SYNC-2. This synchronization may be achieved by the execution of a network protocol, in which the end systems ES1, ES2 and the switch SW exchange protocol data PD. Furthermore, the synchronization protocol may involve the synchronization of communication nodes NODE of two or more fault-tolerant computers FTC and may involve the synchronization of the real-time network NET itself. In this second case, protocol data PD is communicated between end systems ES1, ES2, and switches SW of two or more fault-tolerant computers FTC and the real-time network NET.

In one realization the SAE AS6802 synchronization protocols are used for said synchronization. In this case, one possible realization may be that end system ES1 is configured as synchronization master, end system ES2 is configured as synchronization client, and the switch is configured as synchronization client as well, where synchronization master and synchronization client are functions standardized in the SAE AS6802 standard.

In another realization said first end system ES1, said second end system ES2, and said switch SW would be each be configured to either as synchronization master, synchronization client, or compression master as defined in the SAE AS6802 standard.

In yet another realization the IEEE 802.1AS standard or the IEEE 1588 standard are used for said synchronization of the local clocks ES1-LC, E2-LC, COM-LC, MON-LC to each other. In this case, each end system and each switch is considered as time-aware system according to said standards and standard procedures are followed to synchronize said end systems and switches to each other.

The maximum difference of any two synchronized local clocks ES1-LC, ES2-LC, COM-LC, MON-LC of correctly operating end systems ES1, E2, commander part COM, and monitor part MON is defined as the network synchronization difference SYNC-2. This network synchronization difference SYNC-2 is a known parameter at design time of the communication node NODE.

In one embodiment of the invention said end systems ES1, ES2 are TTEthernet end systems, as for TTE-End System Controller Space TT6802-1-SE or TTE-End System Controller HiRel TT6802-2-SE. In one embodiment of the invention said switch SW is a TTEthernet switch as for example the TTE-Switch Controller Space TT6802-1-S or the TTE-Switch Controller HiRel TT6802-2-SW.

FIG. 4 depicts an example of the inner structure for the commander part COM and the monitor part MON and their synchronization. As depicted, the commander part COM as well as the monitor part MON realize the functionality of a network switch. In particular, the commander part COM comprises commander ports COM-P1-COM-P4 at which it receives and forwards data and a commander switching logic COM-SWL that connects the commander ports COM-P1 -COM-P4 to each other and instructs the commander part COM on how to transfer received data on a first commander port COM-P1-COM-P4 to a second or multitude of commander ports COM-P1-COM-P4. Furthermore the commander part COM comprises a commander schedule table COM-ST and a commander local clock COM-LC. The commander schedule table COM-ST identifies for first end system critical application data ESCAD1 the commander scheduled transmission time TCOM (see for example FIG. 5). When the commander local clock COM-LC equals the commander schedule transmission time TCOM, the commander part COM forwards first end system critical application data ESCAD1 as commander critical application data CCAD to the comperator.

Likewise, the monitor part MON comprises monitor ports MON-P1-MON-P4 at which it receives and forwards data and a monitor switching logic MON-SWL that connects the monitor ports MON-P1-MON-P4 to each other and instructs the monitor part MON on how to transfer received data on a first monitor port MON-P1-MON-P4 to a second or multitude of monitor ports MON-P1-MON-P4. Furthermore the monitor part MON comprises a monitor schedule table MON-ST and a monitor local clock MON-LC. The monitor schedule table MON-ST identifies for second end system critical application data ESCAD2 the monitor scheduled transmission time MCOM (see for example FIG. 5). When the monitor local clock MON-LC equals the monitor schedule transmission time MCOM, the monitor part MON forwards said second end system critical application data ESCAD2 as monitor critical application data MCAD to the comperator.

The commander local clock COM-LC and the monitor local clock MON-LC are synchronized to each other such that their difference is bound by a maximum duration of length SYNC-1, in the case that both commander part COM and monitor MON operate correctly.

In one embodiment of the invention the commander local clock COM-LC and the monitor local clock MON-LC may be implemented by the same physical clock, like a physical oscillator. In this case the switch SW may realize an additional clock monitor that ensures that said physical oscillator operates according its specification and within well-defined margins. In such a realization the difference of the commander local clock COM-LC and monitor local clock MON can be configured to be a static value. Consequently, there will be no relative drift of the commander local clock COM-LC and monitor local clock MON-LC from each other. Thus, the difference will not vary within said maximum duration of length SYNC-1, but will be a constant value less or equal to said duration of length SYNC-1.

Figure 4A:
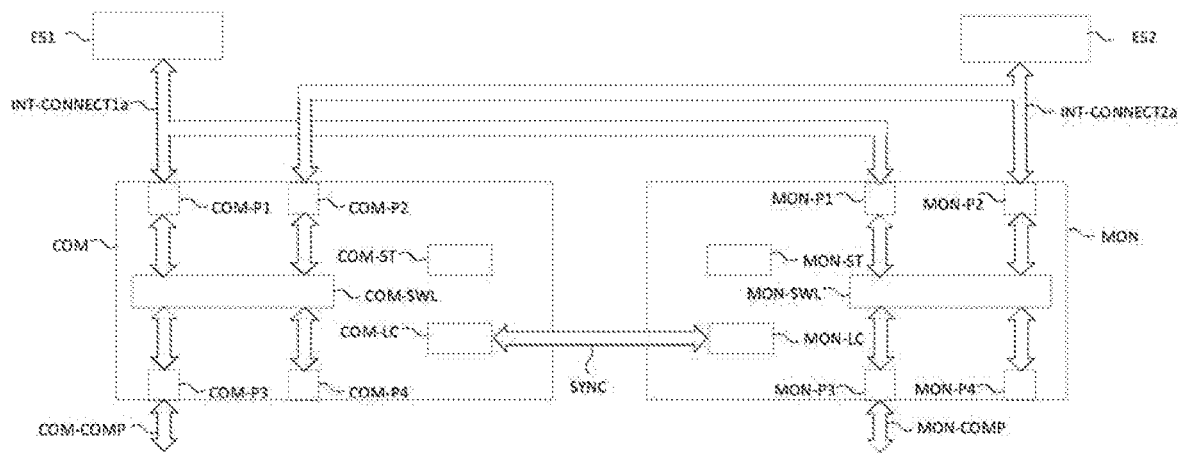
FIG. 4a depicts an example of the inner structure for the commander part and the monitor part and their synchronization.

FIG. 4a depicts another example of the inner structure for the commander part COM and the monitor part MON and their synchronization. The switch SW may expose only one interface for both, the commander part COM and the monitor part MON to an end system ES1, ES2. Thus, the internal connection INT-CONNECT1a connects the end system ES1 to both the commander port COM-P1 as well as to the monitor prat MON-P1, while the internal connection INT-CONNECT2a connects the end system ES2 to both the commander port COM-P2 and the monitor port MON-P2. In one embodiment of the invention, the commander part COM is configured to discard critical application data from the second end system ES2 received on commander port COM-P2, while the monitor part MON is configured to discard critical application data from the first end system ES1 received on monitor port MON-P1.

Figure 5:
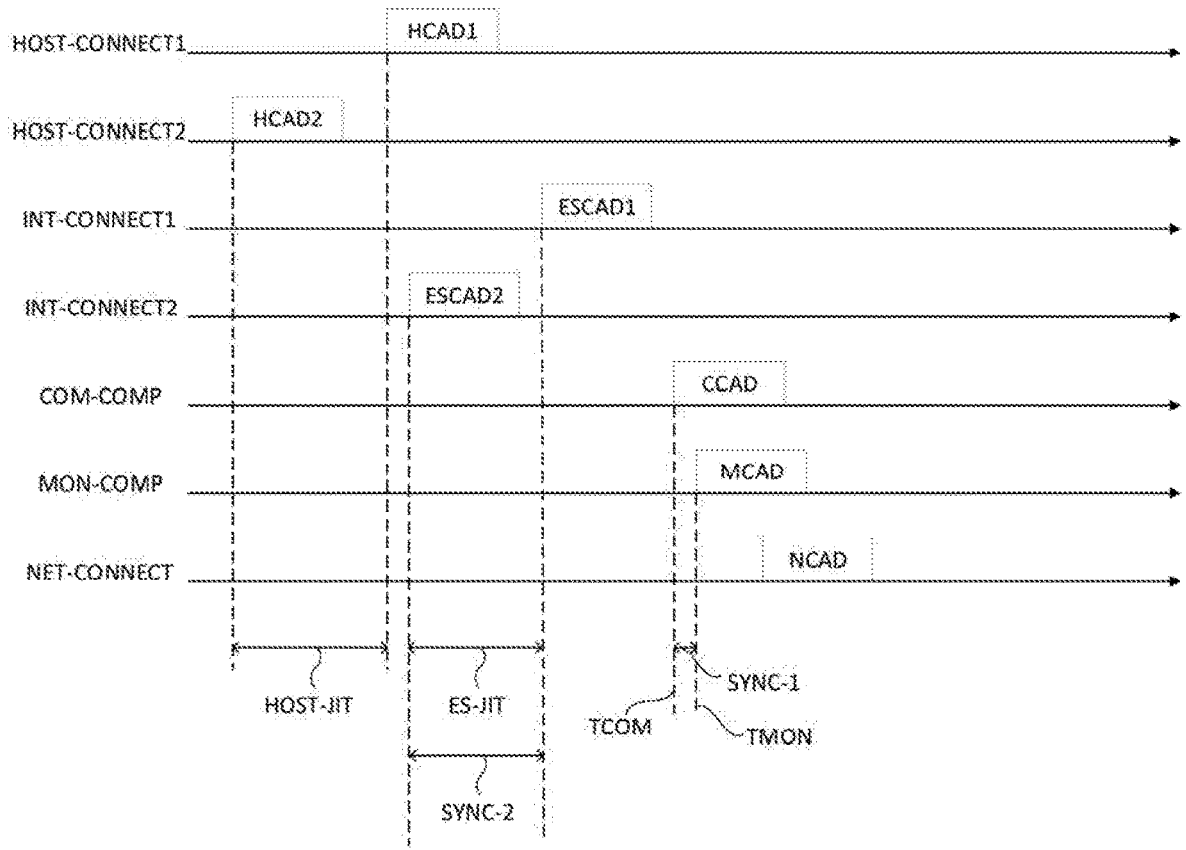
FIG. 5 depicts a dataflow example for a communication node.

FIG. 5 depicts a dataflow example for a communication node NODE as discussed under FIG. 3, i.e., FIG. 5 discusses how critical application data is communicated from two computation hosts HOST to the real-time network NET by means of a communication node NODE. This example depicts the case in which both end system ES1 and ES2 as well as the switch SW, in particular the commander part COM and the monitor part MON, are operating correctly.

In this example a first computation host HOST sends host critical application data HCAD1 to a first end system ES1 via the host connection HOST-CONNECT1. Likewise, a second computation host HOST sends host critical application data HCAD2 to a second end system ES2 via the host connection HOST-CONNECT2. The host critical application data HCAD1 and HCAD2 are typically identical.

The first computation host HOST and the second computation host HOST may not send the host critical application data HCAD1 and HCAD2 at exactly the same point in time, but there may be a difference of up to HOST-JIT time-units. HOST-JIT can be determined before the fault-tolerant computer FTC goes into operation, e.g., at design time of the fault-tolerant computer FTC.

End system ES1 forwards said first host critical application data to the commander part COM of said switch SW as end system critical application data ESCAD1 via the internal connection INT-CONNECT1, while end system ES2 forwards said second host critical application data to the monitor part MON of said switch SW as end system critical application data ESCAD2 via the internal connection INT-CONNECT2.

End system ES1 and end system ES2 may not forward the host critical application data at exactly the same point in time, but there may be a difference of up to a duration ES-JIT time-units. The duration ES-JIT can be determined before the fault-tolerant computer FTC goes into operation, e.g., at design time of the fault-tolerant computer FTC.

One way to determine the duration ES-JIT is be synchronizing the local clocks ES1-LC and ES2 -LC of the end systems ES1 and ES2 to each other with a maximum synchronization difference SYNC-2 to each other. Then the points in time when ES1 and ES2 forward the host critical application data can be configured with respect to the synchronized time. In the case depicted, both end systems ES1 and ES2 could have the same point in time configured when to forward the host critical application data. However, as depicted in FIG. 5, since the local clocks ES1-LC and ES2-LC may differ (in the depicted case the maximum of SYNC-2 time-units), the local clocks ES1-LC and ES2-LC do reach the point in time when to forward the host critical application data not at exactly the same time instance, but with a temporal offset of ES-JIT that in this case equals SYNC-2.

Said commander part COM is configured to forward said first end system critical application data ESCAD1 as commander critical application data CCAD to said comperator part COMP at a commander forwarding point in time TCOM and said monitor is configured to forward said second end system critical application data ESCAD2 as monitor critical application data MCAD to said comperator part at a monitor forwarding point in time TMON. Said commander forwarding point in time TCOM of said commander critical application data CCAD and said monitor forwarding point in time TMON of said monitor critical application data MCAD are preconfigured in the commander part COM and the monitor part MON, respectively. Preferably said commander forwarding point in time TCOM and said monitor forwarding point in time have the same pre-configured value.

Said comperator part COMP is configured to forward either the commander critical application data CCAD or the monitor critical application data MCAD as node critical application data NCAD, if and only if, said commander critical application data CCAD and said monitor critical application data MCAD are identical and the comperator part COMP starts to receive said commander critical application data CCAD and said monitor critical application data MCAD within an interval of configured length SYNC-1.

Preferably the computation hosts HOST send host critical data HCAD1, HCAD2, to the end systems ES1, ES2 a first known sufficient duration before the commander local clock COM-LC reaches the pre-configured commander forwarding point in time TCOM as well as before the monitor local clock MON-LC reaches the pre-configured monitor forwarding point in time TMON. Said first known sufficient duration can be calculated by device specific parameters of the communication node NODE.

Preferably the end systems ES1, ES2 send end system critical data ESCAD1, ESCAD2 to the switch SW a second known sufficient duration before the commander local clock COM-LC reaches the pre-configured commander forwarding point in time TCOM as well as before the monitor local clock MON-LC reaches the pre-configured monitor forwarding point in time TMON. Said second known sufficient duration can be calculated by device specific parameters of the communication node NODE.

Preferably the points in time when the said first and second end systems ES1, ES2 send said first and second end system critical data ES1CAD, ES2CAD to the switch SW are pre-configured, and said first and second end systems ES1, ES2 start the transmission of said end system critical application data ES1CAD, ES2CAD to the switch when their respective end system local clocks ES1-LC, ES2-LC indicate that said pre-configured points in time for transmission are reach.

Figure 6:
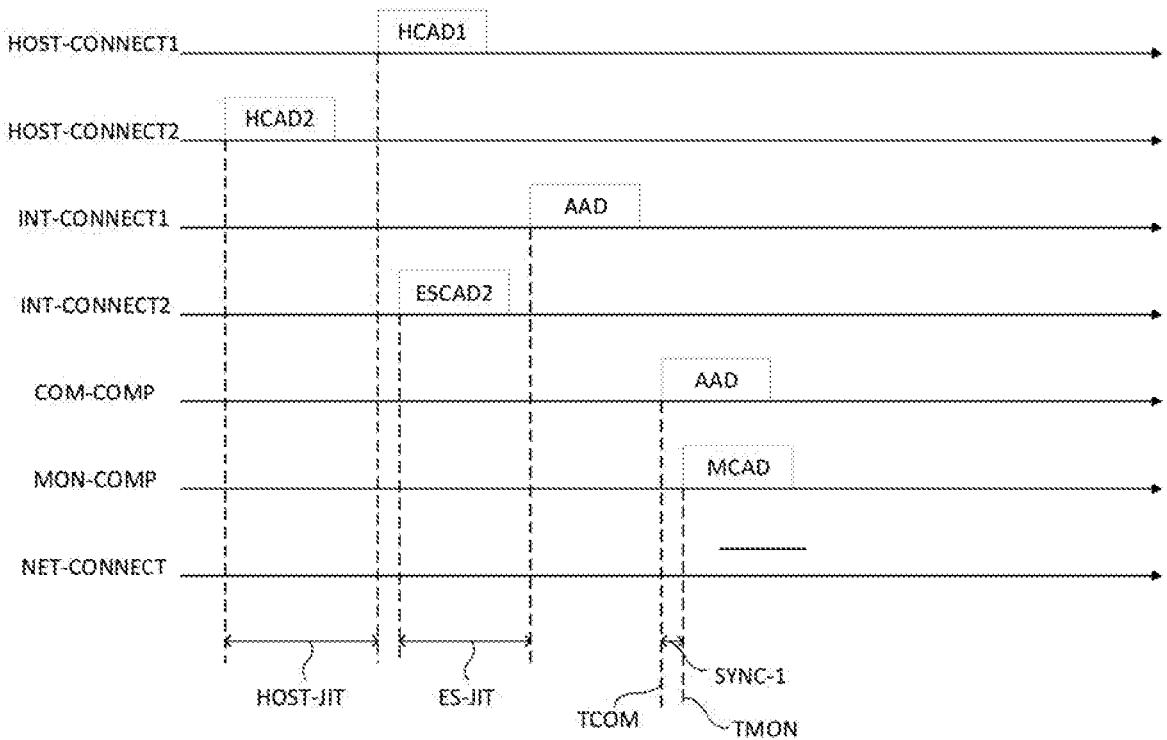
FIG. 6 depicts another dataflow example for a communication node.

FIG. 6 depicts a dataflow example for a communication node NODE as discussed under FIG. 3, i.e., FIG. 6 discusses how critical application data is communicated from two computation hosts HOST to the real-time network NET by means of a communication node NODE. This example depicts the case in which end system ES2 as well as the switch SW, in particular the commander part COM and the monitor part MON, are operating correctly, while end system ES1 operates faulty.

As depicted, the dataflow example is analogous to the dataflow example depicted under FIG. 5 with the difference that the faulty end system ES1 does not correctly forward the host critical application data HCAD1 as end system critical application data ESCAD1, but as arbitrary application data AAD to the switch. As a consequence, also the commander part COM forwards an arbitrary application data AAD to the comperator COMP.

Arbitrary application data may have arbitrary contents and may be send/forwarded at an arbitrary point in time. In particular, arbitrary application data may differ in content and timing from the correct end system critical application data ESCAD1.

The comperator COMP identifies that the monitor critical application data MCAD is different from the arbitrary application data AAD, thus, prevents a transmission as node critical application data to the real-time network NET or interrupts the already ongoing transmission of a node critical application data, in case the transmission of the node critical application data has already been started.

Figure 7:
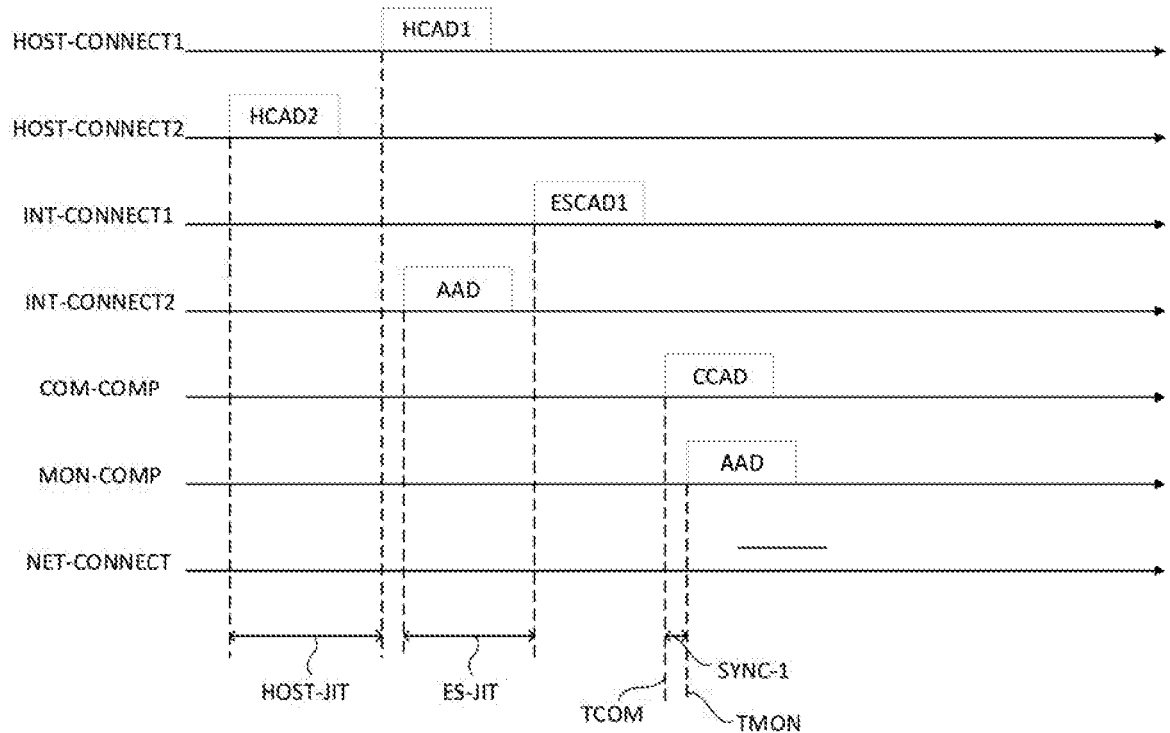
FIG. 7 depicts another dataflow example for a communication node.

FIG. 7 depicts a dataflow example for a communication node NODE as discussed under FIG. 3, i.e., FIG. 7 discusses how critical application data is communicated from two computation hosts HOST to the real-time network NET by means of a communication node NODE. This example depicts the case in which end system ES1 as well as the switch SW, in particular the commander part COM and the monitor part MON, are operating correctly, while end system ES2 operates faulty.

As depicted, the dataflow example is analogous to the dataflow example depicted under FIG. 5 with the difference that the faulty end system ES2 does not correctly forward the host critical application data HCAD2 as end system critical application data ESCAD2, but as arbitrary application data AAD to the switch. As a consequence, also the monitor part MON forwards an arbitrary application data AAD to the comperator COMP.

The comperator COMP identifies that the commander critical application data CCAD is different from the arbitrary application data AAD, thus, prevents a transmission as node critical application data to the real-time network NET or interrupts the already ongoing transmission of a node critical application data, in case the transmission of the node critical application data has already been started.

Figure 8:
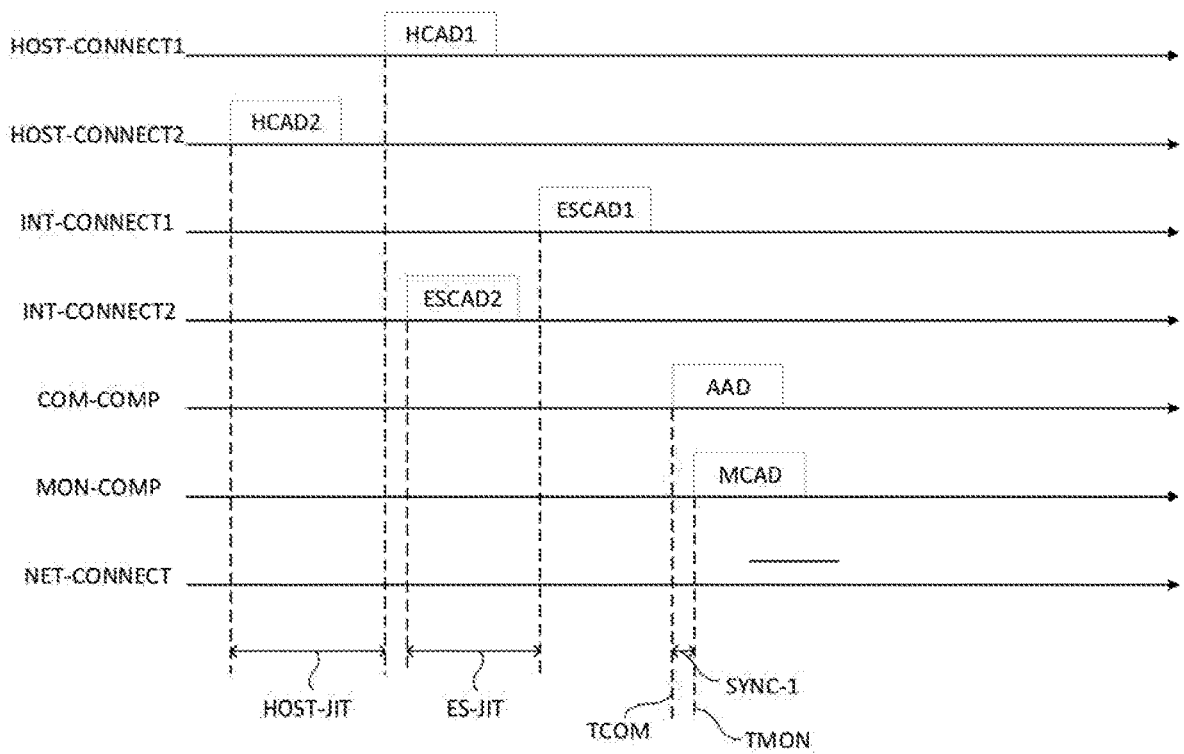
FIG. 8 depicts another dataflow example for a communication node.

FIG. 8 depicts a dataflow example for a communication node NODE as discussed under FIG. 3, i.e., FIG. 8 discusses how critical application data is communicated from two computation hosts HOST to the real-time network NET by means of a communication node NODE. This example depicts the case in which both end systems ES1, ES2 as well as the monitor part MON of the switch SW, are operating correctly, while the commander part COM of the switch SW operates faulty.

As depicted, the dataflow example is analogous to the dataflow example depicted under FIG. 5 with the difference that the faulty commander part COM does not forward the end system critical application data ESCAD1 as commander critical application data CCAD to the comperator, but sends arbitrary application data AAD.

The comperator COMP identifies that the monitor critical application data MCAD is different from the arbitrary application data AAD, thus, prevents a transmission as node critical application data to the real-time network NET or interrupts the already ongoing transmission of a node critical application data, in case the transmission of the node critical application data has already been started.

Figure 9:
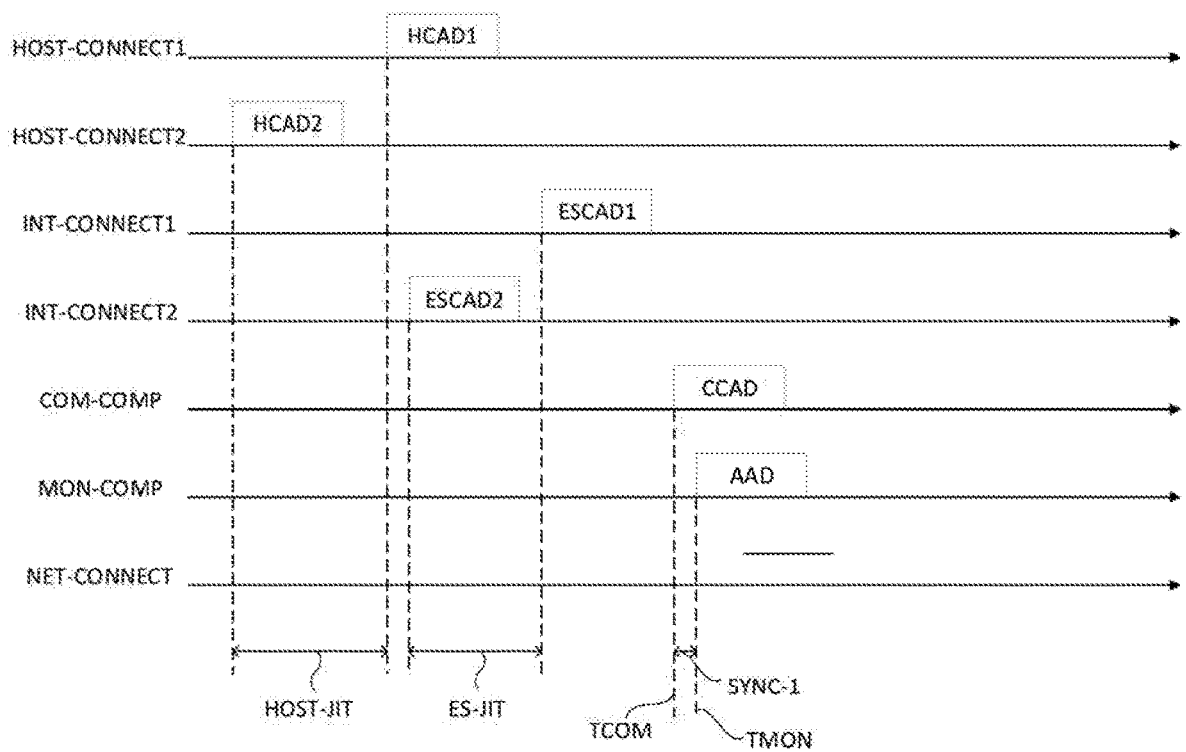
FIG. 9 depicts another dataflow example for a communication node.

FIG. 9 depicts a dataflow example for a communication node NODE as discussed under FIG. 3, i.e., FIG. 9 discusses how critical application data is communicated from two computation hosts HOST to the real-time network NET by means of a communication node NODE. This example depicts the case in which both end systems ES1, ES2 as well as the commander part COM of the switch SW are operating correctly, while the monitor part MON of the switch SW operates faulty.

As depicted, the dataflow example is analogous to the dataflow example depicted under FIG. 5 with the difference that the faulty monitor part MON does not forward the end system critical application data ESCAD2 as monitor critical application data MCAD to the comperator, but sends arbitrary application data AAD.

The comperator COMP identifies that the commander critical application data CCAD is different from the arbitrary application data AAD, thus, prevents a transmission as node critical application data to the real-time network NET or interrupts the already ongoing transmission of a node critical application data, in case the transmission of the node critical application data has already been started.

Figure 9A:
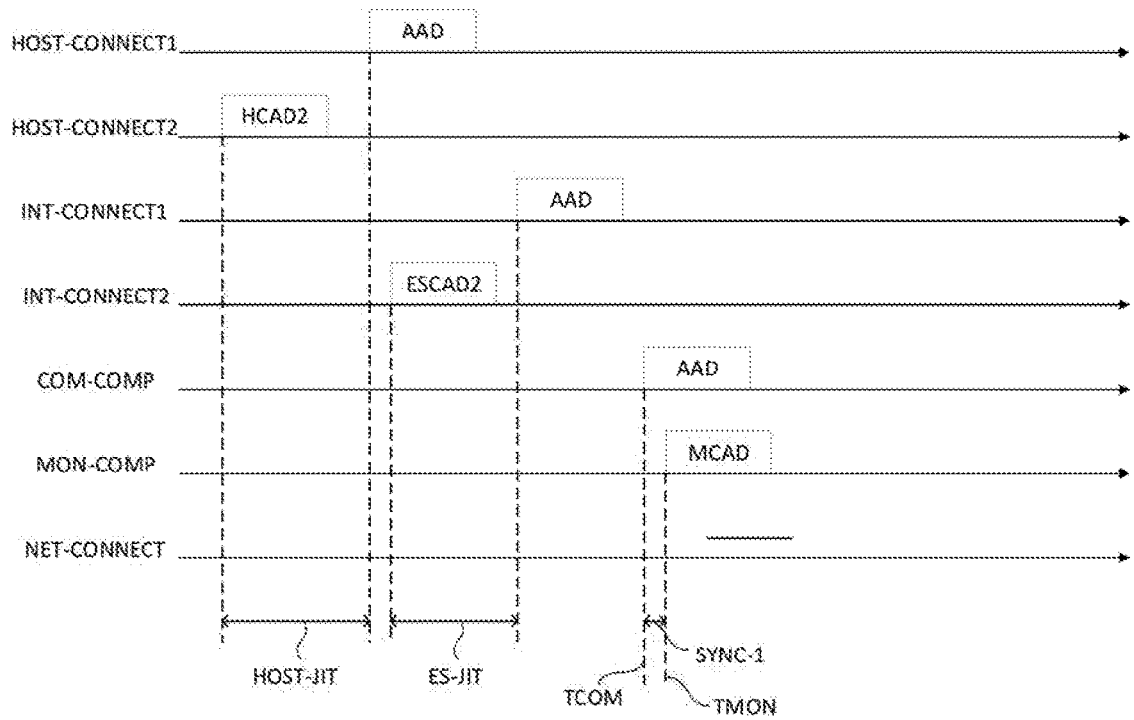
FIG. 9a depicts another dataflow example for a communication node.

FIG. 9a depicts a dataflow example for a communication node NODE as discussed under FIG. 3, i.e., FIG. 9a discusses how critical application data is communicated from two computation hosts HOST to the real-time network NET by means of a communication node NODE. This example depicts the case in which both end systems ES1, ES2 as well as the commander part COM and the monitor part of the switch are operating correctly. In this example the computation host HOST connected to the end system ES1 is faulty and sends arbitrary application data.

As depicted, the dataflow example is analogous to the dataflow example depicted under FIG. 5 with the difference that instead of a correct host critical application data HCAD1 arbitrary application data AAD is forwarded from the computation host HOST connected to end system ES1. The arbitrary application data AAD in this example is forwarded from the end system ES1 to the monitor part MON of the switch SW and further forwarded to the comperator COMP.

The comperator COMP identifies that the monitor critical application data MCAD is different from the arbitrary application data AAD, thus, prevents a transmission as node critical application data to the real-time network NET or interrupts the already ongoing transmission of a node critical application data, in case the transmission of the node critical application data has already been started.

Figure 10:
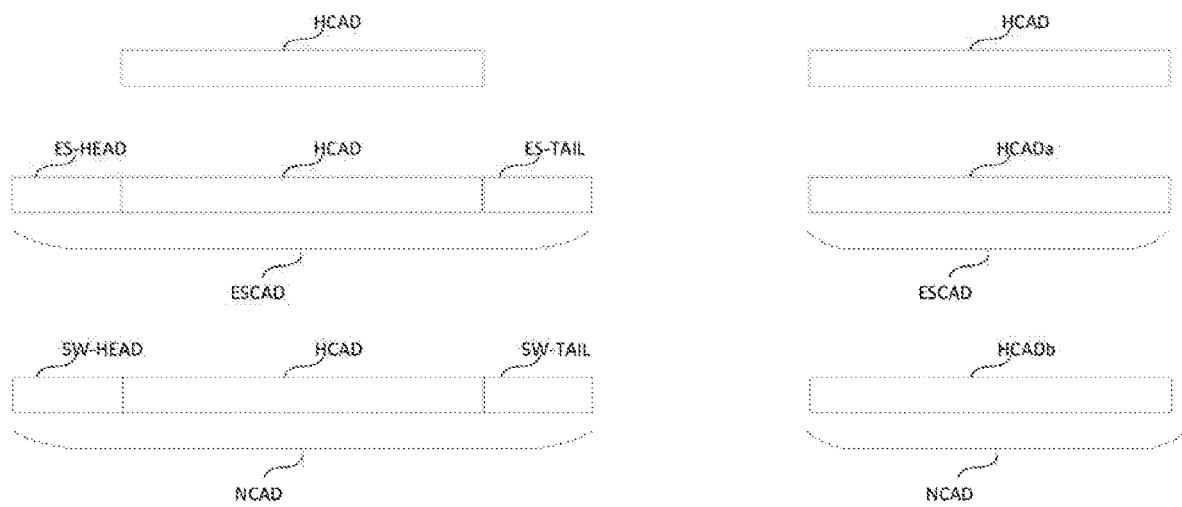
FIG. 10 depicts the relation of the host critical application data, end system critical application data ESCAD, and node critical application data.

FIG. 10 depicts the relation of the host critical application data HCAD, end system critical application data ESCAD, and node critical application data NCAD.

An end system ES1, ES2 may add end system header information ES-HEAD and/or end system tail information ES-TAIL to a received host critical application data HCAD to produce an end system critical application data ESCAD. In one realization the end system critical application data ESCAD may be an Ethernet frame where said end system header information ES-HEAD is an Ethernet header, the host critical application data HCAD is the payload of the Ethernet frame, and the end system tail information ES-TAIL is the Ethernet frame checking sequence. In another realization the end system header information ES-HEAD is an ARINC 664-p7 header and the end system tail information ES-TAIL comprises an ARINC 664-p7 sequence number as well as an frame checking sequence.

In one realization, the end system header information ES-HEAD and end system tail information ES-TAIL is empty. For example in one realization, the host critical application data HCAD is already an Ethernet frame or an ARINC 664-p7 frame. In such a case the end system ES1, ES2 may forward the host critical application data HCAD as is to the switch.

In another realization according to FIG. 10, the host critical application data HCAD is already an Ethernet frame and the end system ES1, ES2 is modifying the Ethernet header and/or Ethernet frame check sequence of said host critical data HCAD to generate the end system critical application data ESCAD, but without modification of the payload of said Ethernet frame indicated by HCADa. In another realization, the host critical application data HCAD is already an ARINC 664-p7 frame and the end system ES1, ES2 is modifying the ARINC 664-p7 header and/or ARINC 664-p7 sequence number and/or frame check sequence of said host critical data HCAD to generate the node critical application data NCAD, but without modification of the payload of said ARINC 664-p7 frame (indicated by HCADa).

In one realization the commander part COM as well as the monitor part MON of the switch forward the end system critical application data ESCAD1, ESCAD2 as commander critical application data CCAD and monitor critical application data MCAD to the comperator part COMP without modification.

In another realization, the commander part COM as well as the monitor part MON of the switch may modify end system header information ES-HEAD to switch header information SW-HEAD and/or modify end system tail information ES-TAIL to switch tail information when producing the commander critical application data CCAD and monitor critical application data MCAD. Again, examples of such transformations are the change of an Ethernet/ARNC 664-p7 header and Ethernet/ARINC 664-p7 sequence number and/or frame check sequence. Another example of modification is VLAN-tagging or a modification of the VLAN tag in case the end system critical application data ESCAD comprises an Ethernet frame.

Another example of modification is a change of timing information (as for example the transparent clock concept as defined in the IEEE 1588, IEEE 802.1AS, or SAE AS6802 standard) in the end system header information ES-HEAD or the end-system tail information ES-TAIL.

The comperator part COMP will not modify commander critical application data CCAD nor the monitor critical application data MCAD when forwarding to the real-time network NET as network critical application data NCAD.

Figure 11:
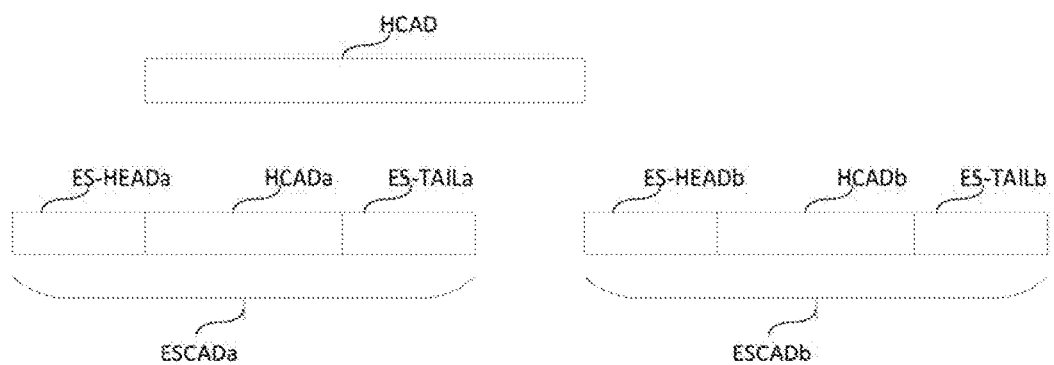
FIG. 11 depicts another relation of the host critical application data, end system critical application data ESCAD.

FIG. 11 depicts another relation of the host critical application data HCAD and end system critical application data. As depicted the host critical application data HCAD may be divided into a multitude of fragments and forwarded by the end system ES1, ES2 as two or a multitude of end system critical application data ESCADa, ESCADb. Each such end system critical application data ESCADa may add additional end system header information ES-HEADa, ES-HEADb, and/or end system tail information ES-TAILa, ES-TAILb, to the respective portion of the host critical application data HCADa, HCADb.

Likewise (not depicted) end system ES1, ES2, may combine two or a multitude of host critical application data HCAD when forwarding an end system critical application data ESCAD.

Figure 12:
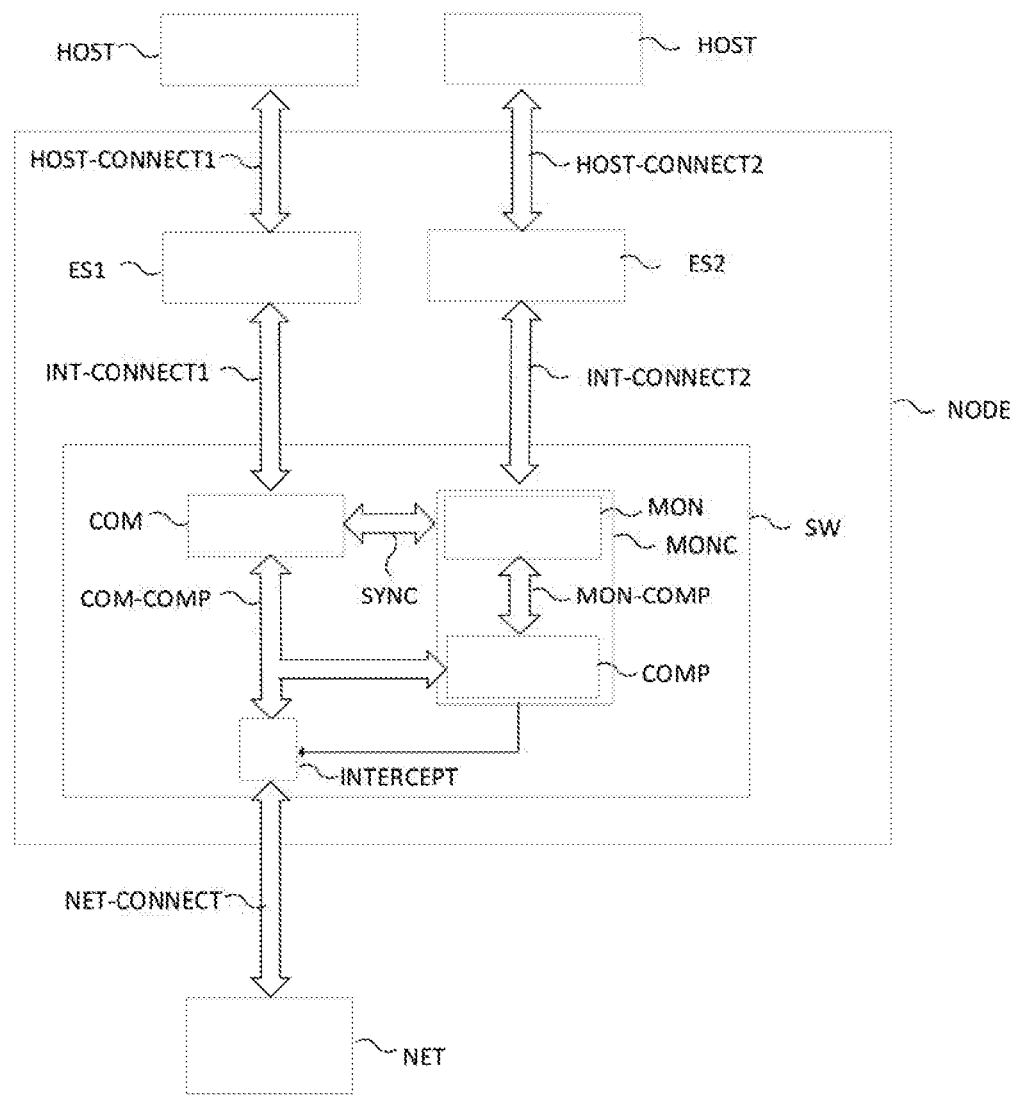
FIG. 12 depicts another example of an inner structure of a communication node.

FIG. 12 depicts an example of an inner structure of a communication node NODE. As depicted, in this example, the communication node NODE comprises two end system ES1, ES2, and a switch SW. The switch SW itself consists of three parts: a commander part COM, a monitor part MON, and a comperator part COMP. In contrast to FIG. 3 and as depicted in FIG. 12, in this realization the monitor part MON and the comperator part COMP are integrated into an integrated part MONC.

In this realization the commander critical application data CCAD is forwarded as node critical application data NCAD if the communication node NODE is correct. However, to control the faulty case, the switch SW is equipped with an interception function INTERCEPT that can prevent the transmission of the commander critical application data CCAD as node critical application data NCAD and/or preempt an ongoing transmission of a commander critical application data CCAD.

The integrated part MONC is configured to trigger the execution of the interception function INTERCEPT, if and only if the commander critical application data CCAD and the monitor critical application data MCAD are not identical or the comperator part COMP does not start to receive said commander critical application data CCAD and said monitor critical application data MCAD within an interval of configured length SYNC-1.

The dataflow examples discussed under FIG. 5 to FIG. 9 are also applicable to the realization discussed here under FIG. 12 with the slight modification that the comperator part COMP is not directly forwarding either the commander critical application data CCAD or the monitor critical application data MCAD, but only indirectly causes a prevention or preemption of the transmission of the commander critical application data CCAD as node critical application data NCAD.

Figure 13:
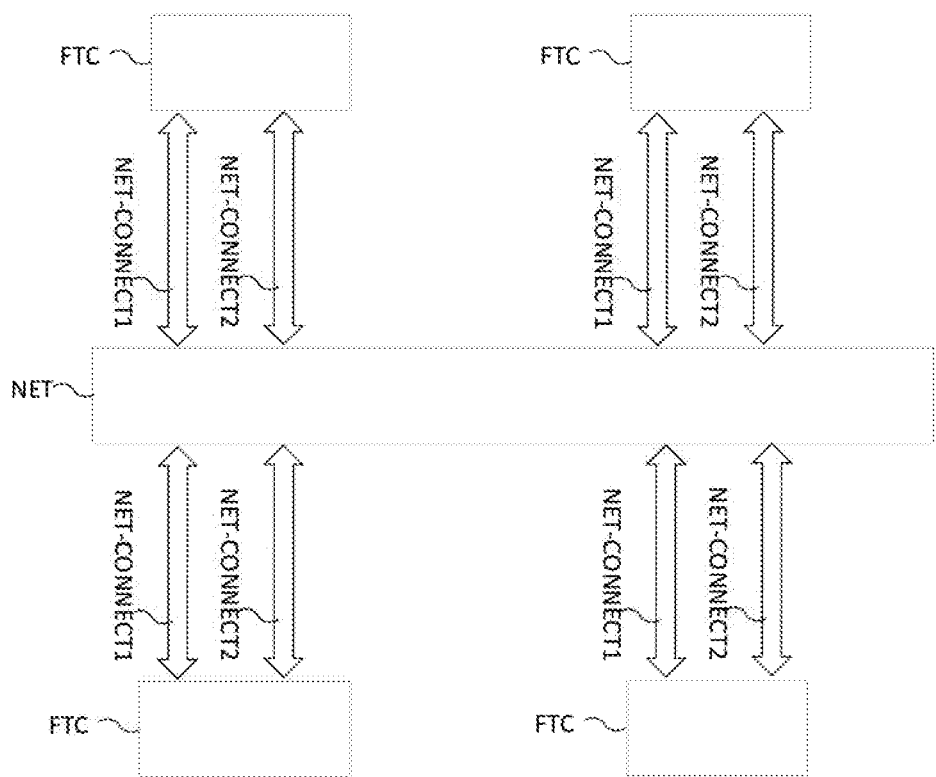
FIG. 13 depicts an example configuration of a fault-tolerant computer system with a real-time network connecting four fault-tolerant computers to each other.

FIG. 13 depicts an example configuration of a fault-tolerant computer system, wherein a real-time network NET is connecting four fault-tolerant computers FTC to each other. In this example configuration each fault-tolerant computer FTC connects to the real-time network NET by means of two network connections, a first network connection NET-CONNECT1 and a second network connection NET-CONNECT2, and transmits at least a first subset of critical application data CAD to the network via said first and said second network connection NET-CONNECT1, NET-CONNECT2.

In one realization, the real-time network NET is a switched Ethernet network with at least two disjoint paths between any two fault-tolerant computers FTC and the disjoint paths are configured such that the transmission of a fault-tolerant computer FTC on a first disjoint path via the first network connection NET-CONNECT1 is also received by all other fault-tolerant computers FTC on their first network connection NET-CONNECT1 in the case that all components (e.g., network switches and wires) on said first disjoint path are correct. Furthermore, the disjoint paths are configured such that the transmission of a fault-tolerant computer FTC on a second disjoint path via said second network connection NET-CONNECT2 is also received by all other fault-tolerant computers FTC on their second network connection NET-CONNECT2 in the case that all components (e.g., network switches and wires) on said first disjoint path are correct.

In one realization the real-time network together with the communication nodes NODE of the fault-tolerant computers FTC forms a TTEthernet network as standardized in the SAE AS6802 standard where said two disjoint paths are realized by two redundant channels.

In another realization the real-time network together with the communication nodes NODE of the fault-tolerant computers FTC forms an ARINC 664-p7 network where said two disjoint paths are realized by two redundant channels.

The communication node NODE in each of the fault-tolerant computers FTC ensures with very high probability that no arbitrary application data is transmitted from a fault-tolerant computer FTC to the real-time network NET. Thus, when a fault-tolerant computer FTC receives two copies of a critical application data CAD via said two disjoint paths (because the transmitting fault-tolerant computer FTC transmitted said critical application data CAD to both network connections NET-CONNECT1 and NET-CONNECT2) it may be configured to forward only said first copy, only said second copy, or both copies to its computation host HOST. In one realization the communication node NODE of said fault-tolerant computer FTC is configured to only forward the copy of said critical application data to the computation HOST that has been received first and to discard the second copy of said critical application data CAD.

Figure 14:
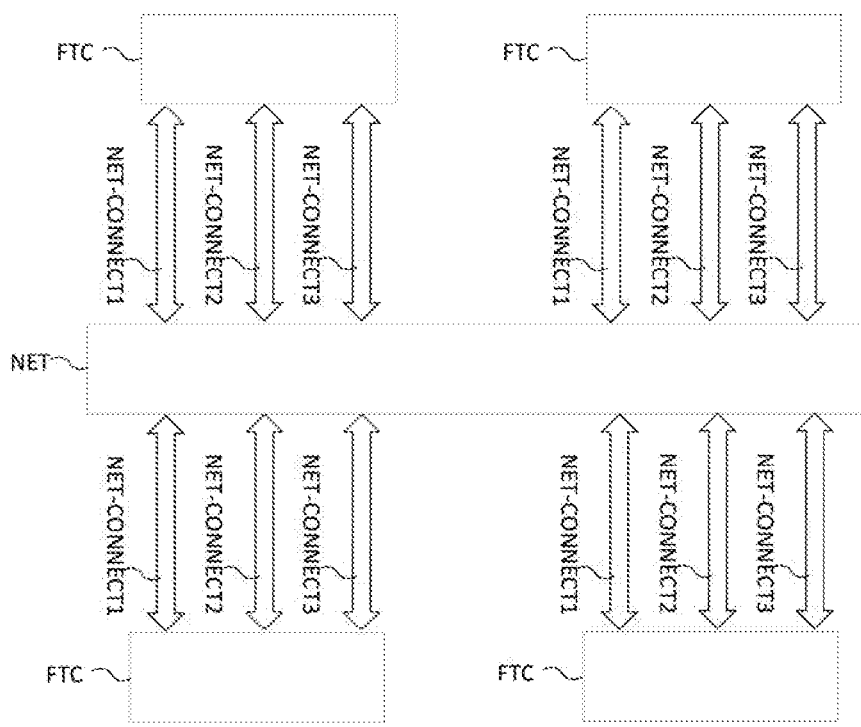
FIG. 14 depicts an example configuration of a fault-tolerant computer system with a real-time network connecting four fault-tolerant computers to each other.

FIG. 14 depicts an example configuration of a real-time network NET connecting four fault-tolerant computers FTC to each other. In this example configuration the fault-tolerant computers FTC, in addition to the features discussed under FIG. 13, implement a third network connection NET-CONNECT3 to the real-time network NET and said network NET is configured implement a third disjoint path that connects said third network connection NET-CONNECT3 to each other.

Such a configuration of a real-time network allows a component, as for example a network switch, to become arbitrarily faulty. As a consequence of such a failure of a network switch, the network itself, in the failure case, may generate arbitrary application data AAD on one of the disjoint paths. Since may be guaranteed by the present invention that a fault-tolerant computer FTC will not transmit arbitrary application data AAD to the real-time network NET, a receiving fault-tolerant computer FTC can even tolerate said failure mode of the real-time network NET. To do so, the receiving fault-tolerant FTC can execute a majority voting, preferably a two-out-of-three majority voting, on the received copies of said critical application data via the three network connections NET-CONNECT1, NET-CONNECT2, NET-CONNECT3. Since by assumption only one disjoint path may produce arbitrary application data AAD and by our invention no FTC will transmit arbitrary application data to the real-time network NET a receiving fault-tolerant computer FTC will always receive at least two matching copies of critical application data CAD on at least two of the three network connections NET-CONNECT1, NET-CONNECT2, NET-CONNECT3. The receiving fault-tolerant computer FTC can, thus, discard any copy of said critical application data CAD that does not match the other two copies.

That which is claimed is:

1. A communication node (NODE) for connecting a fault-tolerant computer (FTC) to a real-time network (NET), wherein said communication node (NODE) receives critical application data (HCAD1, HCAD2) from one, two, or a multitude of computation hosts (HOST) of the fault-tolerant computer (FTC), and wherein said communication node (NODE) is configured to forward said critical application data (HCAD1, HCAD2) as node critical application data (NCAD) to said real-time network (NET), the communication node comprising:

at least a first end system (ES1), a second end system (ES2), and a switch (SW);

wherein said switch (SW) comprises at least a commander part (COM), a monitor part (MON) and a comperator part (COMP), wherein the monitor part (MON) and the comperator part (COMP) are integrated into an integrated part (MONC);

wherein said first end system (ES1) connects to said one, two, or a multitude of computation hosts (HOST) or a subset of those computation hosts (HOST), and wherein said second end system (ES2) connects to said one, two, or a multitude of computation hosts (HOST) or a subset of those computation hosts (HOST);

wherein said first end system (ES1) connects to said commander part (COM) and said second end system (ES2) connects to said monitor part (MON);

wherein said one, two, or multitude of computation hosts (HOST) or a subset of those computation hosts (HOST) provide first host critical application data (HCAD1) to said first end system (ES1) and said one, two, or multitude of computation hosts (HOST) or a subset of those computation hosts (HOST) provide second host critical application data (HCAD2) to said second end system (ES2);

wherein said first end system (ES1) is configured to forward said first host critical application data (HCAD1) as first end system critical application data (ESCAD1) to said commander part (COM) and said second end system (ES2) is configured to forward said second host critical application data (HCAD2) as second end system critical application data (ESCAD2) to said monitor part (MON);

wherein said commander part (COM) is configured to forward said first end system critical application data (ESCAD1) as commander critical application data (CCAD) to said comperator part (COMP) at a pre-configured commander forwarding point in time (TCOM), and wherein said monitor part (MON) is configured to forward said second end system critical application data (ESCAD2) as monitor critical application data (MCAD) to said comperator part at a pre-configured monitor forwarding point in time (TMON);

wherein:

in the case that the monitor part (MON) and the comperator part (COMP) are not integrated into an integrated part, said comperator part (COMP) is configured to forward either the commander critical application data (CCAD) or the monitor critical application data (MCAD) as node critical application data (NCAD), if and only if, said commander critical application data (CCAD) and said monitor critical application data (MCAD) are identical and the comperator part (COMP) starts to receive said commander critical application data (CCAD) and said monitor critical application data (MCAD) within an interval of configured length (SYNC-1), or in the case that the monitor part (MON) and the comperator part (COMP) are integrated into an integrated part (MONC), the commander part (COM) is configured to also forward said first end system critical application data (ESCAD1) as node critical application data (NCAD) to the real-time network (NET), and wherein the switch (SW) comprises an interception function (INTERCEPT) which is configured to preempt an ongoing transmission of a node critical application data (NCAD) and/or is configured to prevent the transmission of a node critical application data (NCAD), and said comperator part (COMP) is configured to activate said interception function (INTERCEPT) if and only if said commander critical application data (CCAD) and said monitor critical application data (MCAD) are not identical or the comperator part (COMP) does not start to receive said commander critical application data (CCAD) and said monitor critical application data (MCAD) within an interval of configured length (SYNC-1); and wherein the first end system (ES1) comprises a first end system local clock (ES1-LC), the second end system (ES2) comprises a second end system local clock (ES2-LC), the commander part (COM) comprises a commander local clock (COM-LC), and the monitor part (MON) comprises a monitor local clock (MON-LC), and wherein said local clocks (ES1-LC, ES2-LC, COM-LC, MON-LC) are synchronized to each other such that in a correct case said local clocks at any time do not differ more than a time duration of a known network synchronization difference (SYNC-2), and wherein in the case that the first end system (ES1), or the second end system (ES2), or the commander part (COM), or the monitor part (MON) is faulty, at least all local clocks of correct end systems (ES1, ES2), correct commander part (COM), and correct monitor part (MON) are synchronized to each other such that said local clocks at any time do not differ more than a time duration of a known network synchronization difference (SYNC-2).

2. The communication node according to claim 1, wherein a network protocol is used to synchronize the end system local clocks (ES1-LC, ES2-LC, COM-LC, MON-LC), and/or the commander local clock (COM-LC), and/or the monitor local clock (MON-LC) to each other.

3. The communication node according to claim 2, wherein the SAE AS6802 standard and/or the IEEE 802.1AS standard and/or the IEEE 1588 standard is used to synchronize the end system local clocks (ES1-LC, ES2-LC), and/or the commander local clock (COM-LC), and/or the monitor local clock (MON-LC) to each other.

4. The communication node according to claim 2, wherein the network protocol is configured to synchronize the local clocks (ES1-LC, ES2-LC, COM-LC, MON-LC) to one, two, or a multitude of local clocks in one, two, or a multitude of other communication nodes (NODE) in other fault-tolerant computers (FTC), wherein the node and the one, two, or multitude of other fault-tolerant computers are connected to each other by a real-time network (NET).

5. The communication node according to claim 1, wherein the commander local clock (COM-LC) and the monitor local clock (MON-LC) are realized by the same physical clock such that said local clocks (COM-LC, MON-LC) are synchronized to each other with a configurable value within an interval of configured length (SYNC-1) and the commander local clock (COM-LC) and the monitor local clock (MON-LC) experience zero relative drift from each other.

6. The communication node according to claim 1, wherein the commander part (COM) and the monitor part (MON) each implement a local clock (COM-LC, MON-LC), which local clocks are synchronized to each other with a maximum synchronization difference (SYNC- 1).

7. The communication node according to claim 6, wherein the maximum synchronization difference (SYNC-1) is smaller than the known network synchronization difference (SYNC-2).

8. The communication node according to claim 1, wherein the commander part (COM) has access to a commander schedule table (COM-ST) that configures for each commander critical application data (CCAD) of the commander part a point in time when to forward said commander critical application data (CCAD), and/or wherein the monitor part (MON) has access to a monitor schedule table (MON-ST) that configures for each monitor critical application data (MCAD) of the monitor part a point in time when to forward said monitor critical application data (MCAD).

9. The communication node according to claim 1, wherein the first end system and the second end system (ES1, ES2) have access to schedule tables that configure for said first end system (ES1) and for said second end system (ES2) a point in time when to forward said first end system critical application data (ES1CAD) and said second end system critical application data (ES2CAD) to the commander part (COM) or to the monitor part (MON), respectively.

10. The communication node according to claim 1, wherein the node (NODE), in addition to critical application data (CAD), also receives application data (AD) from one, two, or a multitude of computation hosts (HOST), wherein said application data (AD) are not critical application data, and wherein the communication node (NODE) forwards said application data (AD) as node application data (NAD) to the real-time network (NET) without execution of the comperator part (COMP) with respect to said not critical application data in the switch (SW).

11. The communication node according to claim 1, wherein the node (NODE) connects the first end system (ES1) and the second end system (ES2) to both the commander part (COM) and the monitor part (MON), and wherein the commander part (COM) is configured to discard end system critical application data (ES2CAD) from the second end system (ES2), and wherein the monitor part (MON) is configured to discard end system critical application data (ES1CAD) from the first end system (ES1).

12. The communication node according to claim 1, wherein the node is integrated in or is a component of the fault-tolerant computer which it connects to a real-time network.

13. A fault-tolerant distributed computer system comprising a multitude of fault-tolerant computers (FTC), which are connected to each other by a real-time network (NET), wherein one or a multitude of said computers each comprises a communication node according to claim 1, and wherein a computer comprising such a node is connected to the real-time network with this node.

14. The fault-tolerant distributed computer system according to claim 13, wherein the fault-tolerant computers (FTC) are connected to each other by two or a multitude of disjoint network paths of the real-time network (NET).

15. The fault-tolerant distributed computer system according to claim 14, wherein a transmitting fault-tolerant computer (FTC) transmits two or a multitude of copies of the same critical application data (CAD) via said two or a multitude of disjoint network paths and a receiving fault-tolerant computer (FTC) forwards only one copy of said critical application data (CAD) to its computing host (HOST), which comprises the first received copy of said critical application data (CAD).

16. The fault-tolerant distributed computer system according to claim 14, wherein the fault-tolerant computers (FTC) are connected to each other by three or a multitude of disjoint network paths of the real-time network (NET).

17. The fault-tolerant distributed computer system according to claim 16, wherein a transmitting fault-tolerant computer (FTC) transmits three or a multitude of copies of the same critical application data (CAD) via said three or a multitude of disjoint network paths and a receiving fault-tolerant computer system (FTC) executes majority voting, which comprises a two-out-of-three majority voting, on said copies of said critical application data (CAD).

18. A communication node (NODE) for connecting a fault-tolerant computer (FTC) to a real-time network (NET), wherein said communication node (NODE) receives critical application data (HCAD1, HCAD2) from one, two, or a multitude of computation hosts (HOST) of the fault-tolerant computer (FTC), and wherein said communication node (NODE) is configured to forward said critical application data (HCAD1, HCAD2) as node critical application data (NCAD) to said real-time network (NET), the communication node comprising:

at least a first end system (ES1), a second end system (ES2), and a switch (SW);

wherein said switch (SW) comprises at least a commander part (COM), a monitor part (MON) and a comperator part (COMP), wherein the monitor part (MON) and the comperator part (COMP) are integrated into an integrated part (MONC);

wherein said first end system (ES1) connects to said one, two, or a multitude of computation hosts (HOST) or a subset of those computation hosts (HOST), and wherein said second end system (ES2) connects to said one, two, or a multitude of computation hosts (HOST) or a subset of those computation hosts (HOST);

wherein said first end system (ES1) connects to said commander part (COM) and said second end system (ES2) connects to said monitor part (MON);

wherein said one, two, or multitude of computation hosts (HOST) or a subset of those computation hosts (HOST) provide first host critical application data (HCAD1) to said first end system (ES1) and said one, two, or multitude of computation hosts (HOST) or a subset of those computation hosts (HOST) provide second host critical application data (HCAD2) to said second end system (ES2);

wherein said first end system (ES1) is configured to forward said first host critical application data (HCAD1) as first end system critical application data (ESCAD1) to said commander part (COM) and said second end system (ES2) is configured to forward said second host critical application data (HCAD2) as second end system critical application data (ESCAD2) to said monitor part (MON);

wherein said commander part (COM) is configured to forward said first end system critical application data (ESCAD1) as commander critical application data (CCAD) to said comperator part (COMP) at a pre-configured commander forwarding point in time (TCOM), and wherein said monitor part (MON) is configured to forward said second end system critical application data (ESCAD2) as monitor critical application data (MCAD) to said comperator part at a pre-configured monitor forwarding point in time (TMON);

and wherein:

in the case that the monitor part (MON) and the comperator part (COMP) are not integrated into an integrated part, said comperator part (COMP) is configured to forward either the commander critical application data (CCAD) or the monitor critical application data (MCAD) as node critical application data (NCAD), if and only if, said commander critical application data (CCAD) and said monitor critical application data (MCAD) are identical and the comperator part (COMP) starts to receive said commander critical application data (CCAD) and said monitor critical application data (MCAD) within an interval of configured length (SYNC-1), or in the case that the monitor part (MON) and the comperator part (COMP) are integrated into an integrated part (MONC), the commander part (COM) is configured to also forward said first end system critical application data (ESCAD1) as node critical application data (NCAD) to the real-time network (NET), and wherein the switch (SW) comprises an interception function (INTERCEPT) which is configured to pre-empt an ongoing transmission of a node critical application data (NCAD) and/or is configured to prevent the transmission of a node critical application data (NCAD), and said comperator part (COMP) is configured to activate said interception function (INTERCEPT) if and only if said commander critical application data (CCAD) and said monitor critical application data (MCAD) are not identical or the comperator part (COMP) does not start to receive said commander critical application data (CCAD) and said monitor critical application data (MCAD) within an interval of configured length (SYNC-1); and wherein the node (NODE), in addition to critical application data (CAD), also receives application data (AD) from one, two, or a multitude of computation hosts (HOST), wherein said application data (AD) are not critical application data, and wherein the communication node (NODE) forwards said application data (AD) as node application data (NAD) to the real-time network (NET) without execution of the comperator part (COMP) with respect to said not critical application data in the switch (SW).

19. A communication node (NODE) for connecting a fault-tolerant computer (FTC) to a real-time network (NET), wherein said communication node (NODE) receives critical application data (HCAD1, HCAD2) from one, two, or a multitude of computation hosts (HOST) of the fault-tolerant computer (FTC), and wherein said communication node (NODE) is configured to forward said critical application data (HCAD1, HCAD2) as node critical application data (NCAD) to said real-time network (NET), the communication node comprising:

at least a first end system (ES1), a second end system (ES2), and a switch (SW);

wherein said switch (SW) comprises at least a commander part (COM), a monitor part (MON) and a comperator part (COMP), wherein the monitor part (MON) and the comperator part (COMP) are integrated into an integrated part (MONC);

wherein said first end system (ES1) connects to said one, two, or a multitude of computation hosts (HOST) or a subset of those computation hosts (HOST), and wherein said second end system (ES2) connects to said one, two, or a multitude of computation hosts (HOST) or a subset of those computation hosts (HOST);

wherein said first end system (ES1) connects to said commander part (COM) and said second end system (ES2) connects to said monitor part (MON);

wherein said one, two, or multitude of computation hosts (HOST) or a subset of those computation hosts (HOST) provide first host critical application data (HCAD1) to said first end system (ES1) and said one, two, or multitude of computation hosts (HOST) or a subset of those computation hosts (HOST) provide second host critical application data (HCAD2) to said second end system (ES2);
wherein said first end system (ES1) is configured to forward said first host critical application data (HCAD1) as first end system critical application data (ESCAD1) to said commander part (COM) and said second end system (ES2) is configured to forward said second host critical application data (HCAD2) as second end system critical application data (ESCAD2) to said monitor part (MON);
wherein said commander part (COM) is configured to forward said first end system critical application data (ESCAD1) as commander critical application data (CCAD) to said comperator part (COMP) at a pre-configured commander forwarding point in time (TCOM), and wherein said monitor part (MON) is configured to forward said second end system critical application data (ESCAD2) as monitor critical application data (MCAD) to said comperator part at a pre-configured monitor forwarding point in time (TMON);
and wherein:
in the case that the monitor part (MON) and the comperator part (COMP) are not integrated into an integrated part, said comperator part (COMP) is configured to forward either the commander critical application data (CCAD) or the monitor critical application data (MCAD) as node critical application data (NCAD), if and only if, said commander critical application data (CCAD) and said monitor critical application data (MCAD) are identical and the comperator part (COMP) starts to receive said commander critical application data (CCAD) and said monitor critical application data (MCAD) within an interval of configured length (SYNC-1), or
in the case that the monitor part (MON) and the comperator part (COMP) are integrated into an integrated part (MONC), the commander part (COM) is configured to also forward said first end system critical application data (ESCAD1) as node critical application data (NCAD) to the real-time network (NET), and wherein the switch (SW) comprises an interception function (INTERCEPT) which is configured to pre-empt an ongoing transmission of a node critical application data (NCAD) and/or is configured to prevent the transmission of a node critical application data (NCAD), and said comperator part (COMP) is configured to activate said interception function (INTERCEPT) if and only if said commander critical application data (CCAD) and said monitor critical application data (MCAD) are not identical or the comperator part (COMP) does not start to receive said commander critical application data (CCAD) and said monitor critical application data (MCAD) within an interval of configured length (SYNC-1); and
wherein the node (NODE) connects the first end system (ES1) and the second end system (ES2) to both the commander part (COM) and the monitor part (MON), and wherein the commander part (COM) is configured to discard end system critical application data (ES2CAD) from the second end system (ES2), and wherein the monitor part (MON) is configured to discard end system critical application data (ES1CAD) from the first end system (ES1).

20. A fault-tolerant distributed computer system comprising a multitude of fault-tolerant computers (FTC), which are connected to each other by a real-time network (NET), wherein one or a multitude of said computers each comprises a communication node, and wherein a computer comprising such a node is connected to the real-time network with said node, wherein said communication node (NODE) receives critical application data (HCAD1, HCAD2) from one, two, or a multitude of computation hosts (HOST) of the fault-tolerant computer (FTC), and wherein said communication node (NODE) is configured to forward said critical application data (HCAD1, HCAD2) as node critical application data (NCAD) to said real-time network (NET), the communication node comprising:
at least a first end system (ES1), a second end system (ES2), and a switch (SW);
wherein said switch (SW) comprises at least a commander part (COM), a monitor part (MON) and a comperator part (COMP), wherein the monitor part (MON) and the comperator part (COMP) are integrated into an integrated part (MONC);
wherein said first end system (ES1) connects to said one, two, or a multitude of computation hosts (HOST) or a subset of those computation hosts (HOST), and wherein said second end system (ES2) connects to said one, two, or a multitude of computation hosts (HOST) or a subset of those computation hosts (HOST);
wherein said first end system (ES1) connects to said commander part (COM) and said second end system (ES2) connects to said monitor part (MON);
wherein said one, two, or multitude of computation hosts (HOST) or a subset of those computation hosts (HOST) provide first host critical application data (HCAD1) to said first end system (ES1) and said one, two, or multitude of computation hosts (HOST) or a subset of those computation hosts (HOST) provide second host critical application data (HCAD2) to said second end system (ES2);
wherein said first end system (ES1) is configured to forward said first host critical application data (HCAD1) as first end system critical application data (ESCAD1) to said commander part (COM) and said second end system (ES2) is configured to forward said second host critical application data (HCAD2) as second end system critical application data (ESCAD2) to said monitor part (MON);
wherein said commander part (COM) is configured to forward said first end system critical application data (ESCAD1) as commander critical application data (CCAD) to said comperator part (COMP) at a pre-configured commander forwarding point in time (TCOM), and wherein said monitor part (MON) is configured to forward said second end system critical application data (ESCAD2) as monitor critical application data (MCAD) to said comperator part at a pre-configured monitor forwarding point in time (TMON);
and wherein:
in the case that the monitor part (MON) and the comperator part (COMP) are not integrated into an integrated part, said comperator part (COMP) is configured to forward either the commander critical application data (CCAD) or the monitor critical application data (MCAD) as node critical application data (NCAD), if and only if, said commander critical application data (CCAD) and said monitor critical application data (MCAD) are identical and the comperator part (COMP) starts to receive said commander critical application data (CCAD) and said monitor critical application data (MCAD) within an interval of configured length (SYNC-1), or in the case that the monitor part (MON) and the comperator part (COMP) are integrated into an integrated part (MONC), the commander part (COM) is configured to also forward said first end system critical application data (ESCAD1) as node critical application data (NCAD) to the real-time network (NET), and wherein the switch (SW) comprises an interception function (INTERCEPT) which is configured to pre-empt an ongoing transmission of a node critical application data (NCAD) and/or is configured to prevent the transmission of a node critical application data (NCAD), and said comperator part (COMP) is configured to activate said interception function (INTERCEPT) if and only if said commander critical application data (CCAD) and said monitor critical application data (MCAD) are not identical or the comperator part (COMP) does not start to receive said commander critical application data (CCAD) and said monitor critical application data (MCAD) within an interval of configured length (SYNC-1); and wherein the fault-tolerant computers (FTC) are connected to each other by two or a multitude of disjoint network paths of the real-time network (NET).

* * * * *